Aug. 25, 1959  F. A. CHIDSEY, JR., ET AL  2,900,772
MACHINE FOR LOADING CANS INTO CARTONS
Filed Dec. 28, 1956  7 Sheets-Sheet 1

INVENTORS
FRANCIS A. CHIDSEY, JR.
AND JOSEPH H. WALTER
BY C. H. Seeley
ATTORNEY

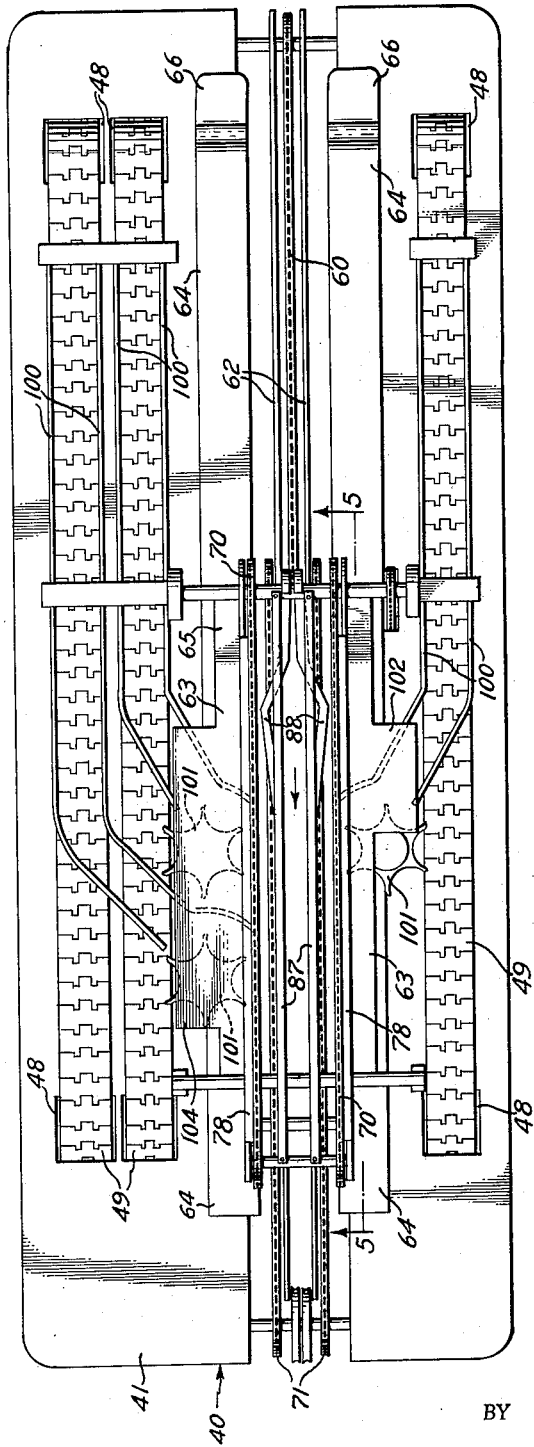

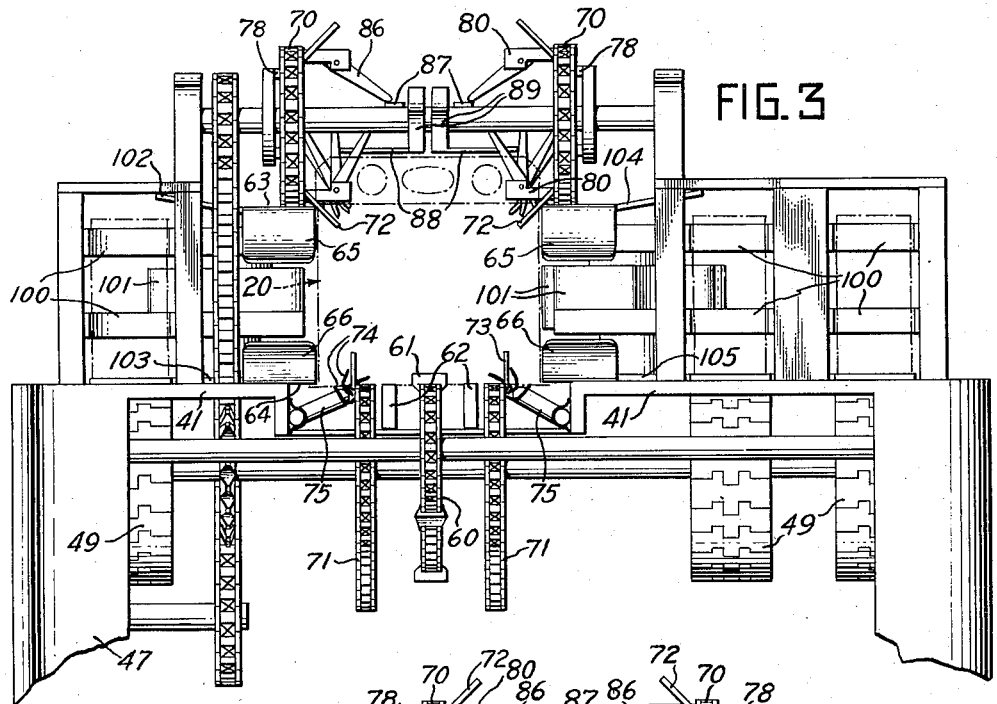
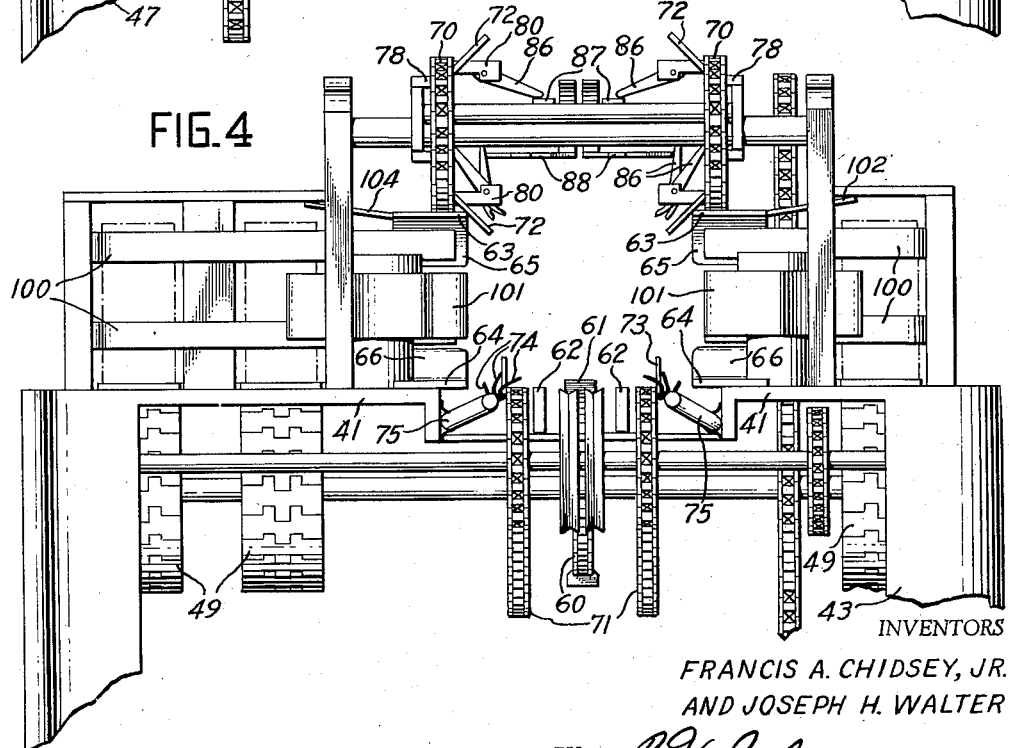
INVENTORS
FRANCIS A. CHIDSEY, JR.
AND JOSEPH H. WALTER
BY C. H. Seeley
ATTORNEY

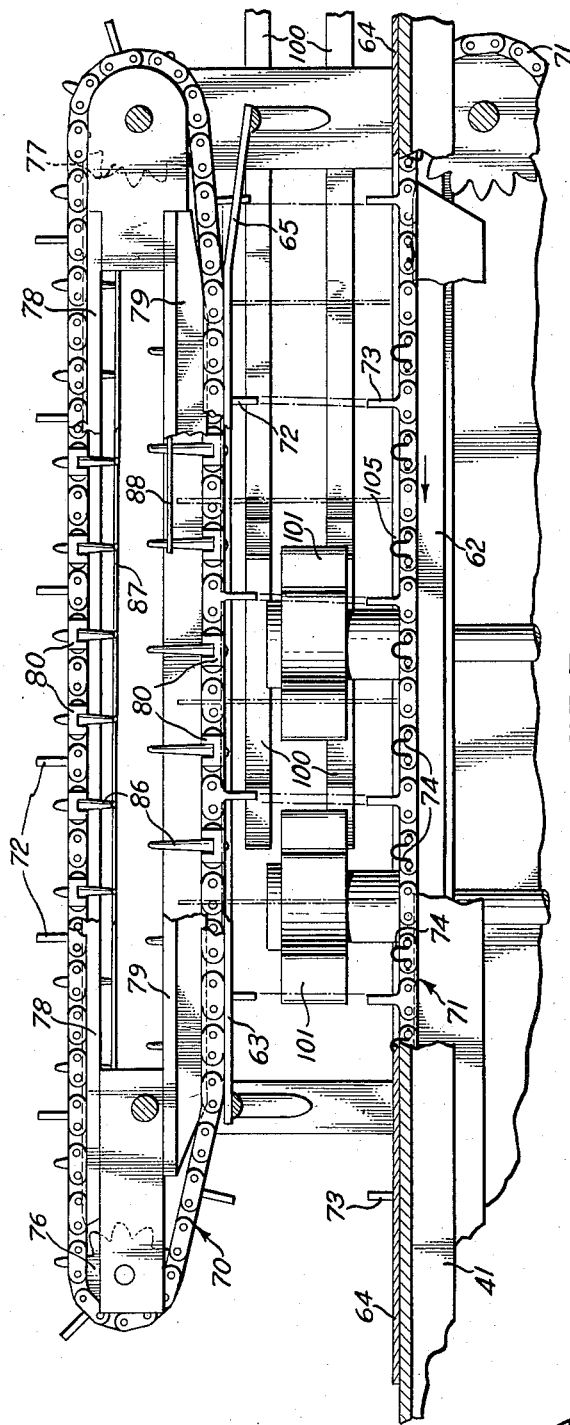

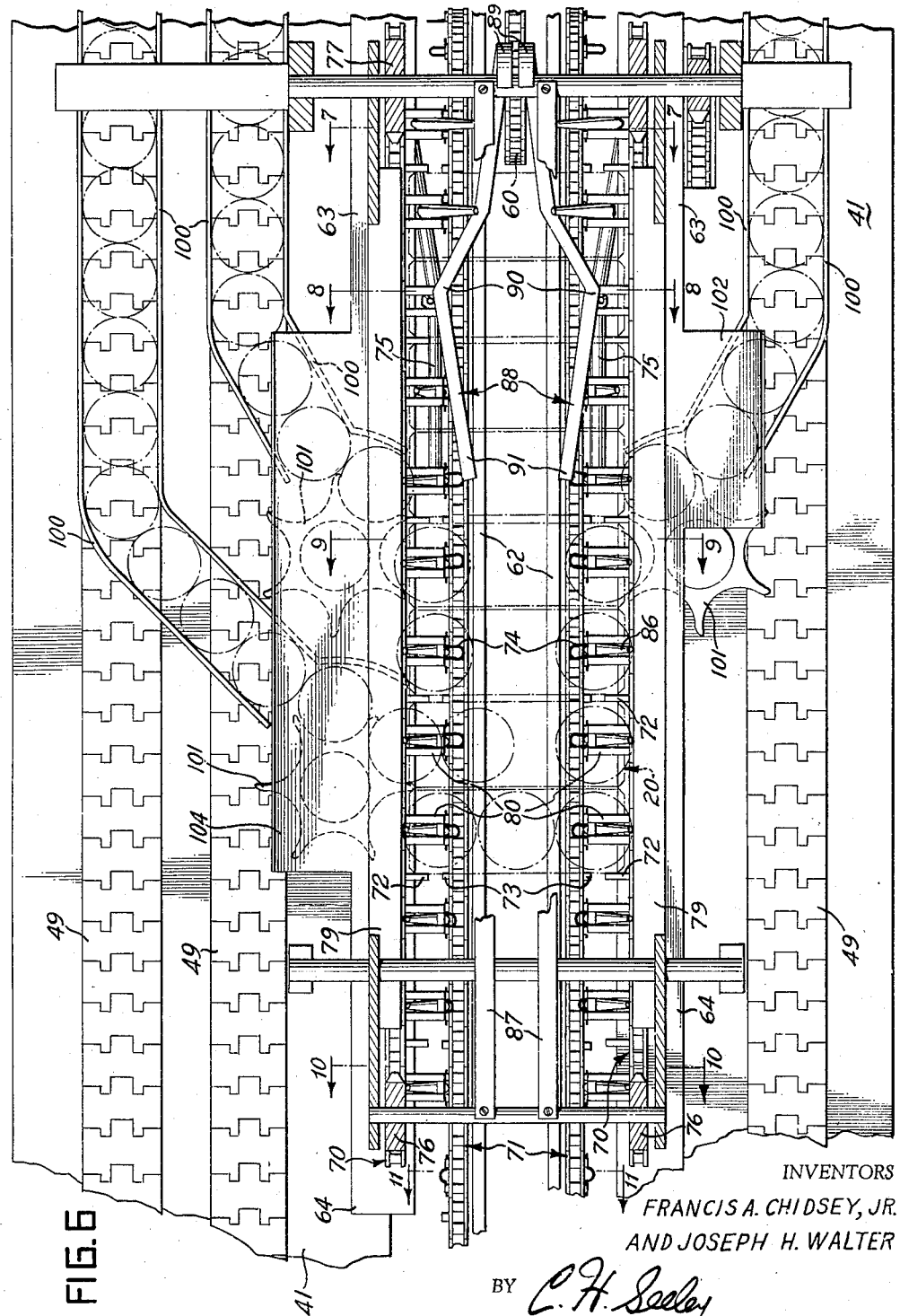

Aug. 25, 1959　　F. A. CHIDSEY, JR., ET AL　　2,900,772
MACHINE FOR LOADING CANS INTO CARTONS
Filed Dec. 28, 1956　　　　　　　　　　　　7 Sheets-Sheet 6
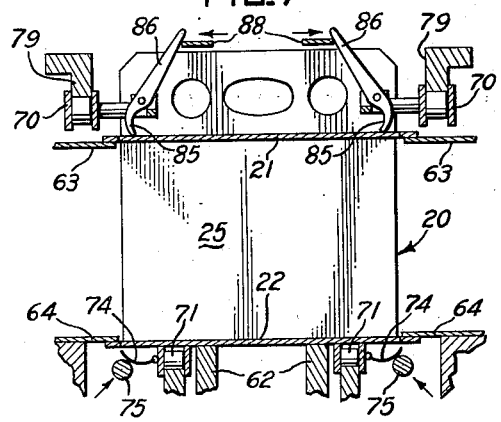
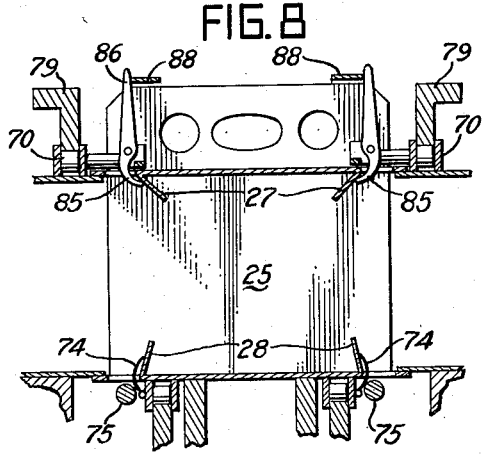
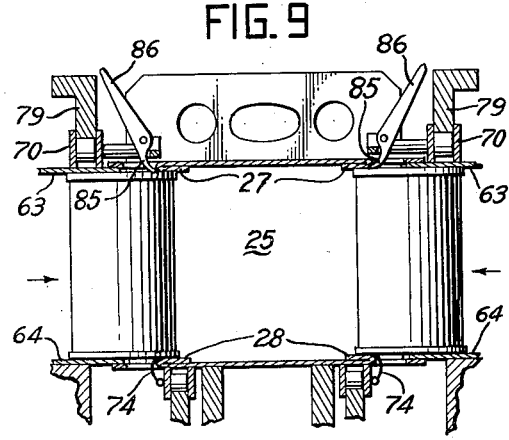
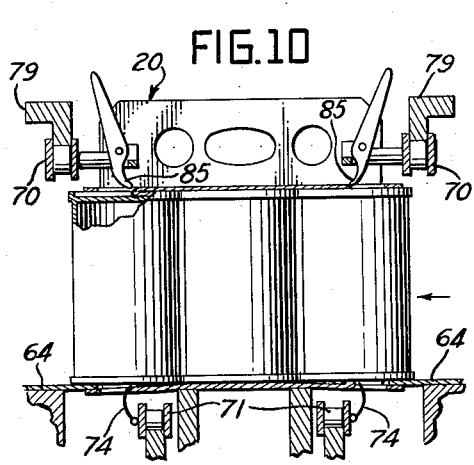
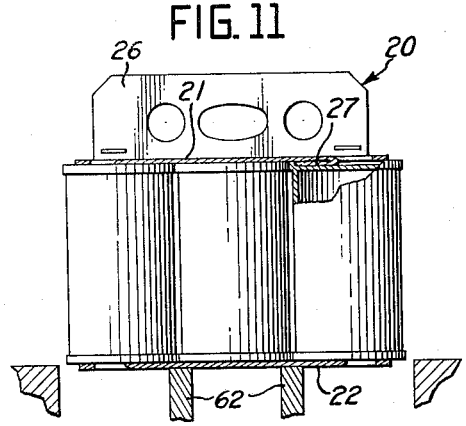
INVENTORS
FRANCIS A. CHIDSEY, JR.
AND JOSEPH H. WALTER
BY
ATTORNEY Aug. 25, 1959   F. A. CHIDSEY, JR., ET AL   2,900,772
MACHINE FOR LOADING CANS INTO CARTONS
Filed Dec. 28, 1956   7 Sheets-Sheet 7
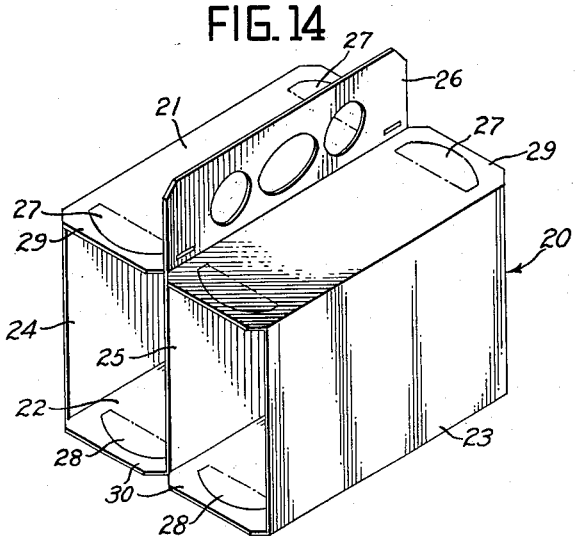
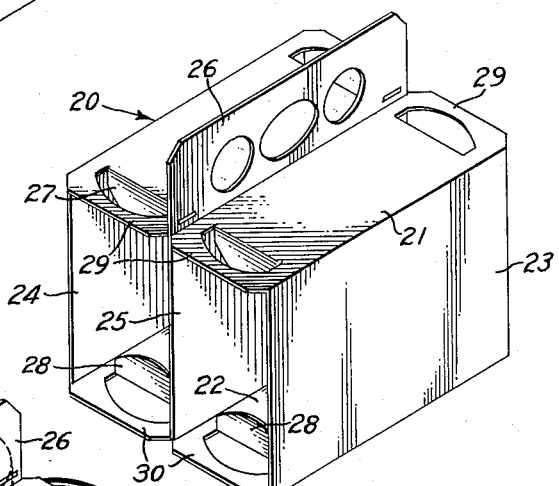
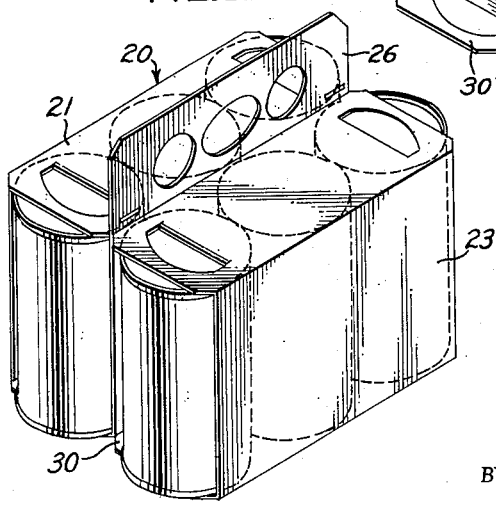
INVENTORS
FRANCIS A. CHIDSEY, JR.
AND JOSEPH H. WALTER
BY C. H. Seeley
ATTORNEY United States Patent Office 2,900,772
Patented Aug. 25, 1959

2,900,772

MACHINE FOR LOADING CANS INTO CARTONS

Francis A. Chidsey, Jr., and Joseph H. Walter, Wayne, Pa., assignors to Container Corporation of America, Chicago, Ill., a corporation of Delaware Application December 28, 1956, Serial No. 631,312

4 Claims. (Cl. 53—48)

This invention relates to machines for loading cans into cartons, and has particular reference to machines for inserting cans or equivalent containers having chimes at their ends into sleeve-type cartons which are open at their ends and which have locking tabs formed from the top and bottom walls of each carton.

Cartons of the type referred to may be generally classified into two groups, those adapted to accommodate a single line of cans and having no handle, and those adapted to hold two lines of cans and having a handle member centrally joined to the top of the carton. A carton of the latter group is illustrated in G. H. Parker Patent 2,614,737, granted October 21, 1952. In loading cans into either of these styles, it is necessary to break the locking tabs and fold them inwardly through a substantial angle before the cans can be inserted into the cartons. When this operation is carried on at high speed, there is danger that the tabs may not fold properly, but that the carton walls to which they are joined may be excessively deflected, thus causing improper folding of the tabs. Needless to say, such improper folding is extremely undesirable, since it results in defective packages and shut-down of the machine.

It is an object of the invention to provide a continuous high speed machine for loading cans into cartons of the open-end sleeve type which is positive in its action and yet is simple and inexpensive. Another object is to provide such a machine which is adapted to load cans into such cartons whether or not they are provided with upstanding handle elements. Still another object is to provide such a machine which insures proper folding of the locking tabs of open-end sleeve type cartons and loading of cans into the same at high speed. Other objects and advantages of the invention will be apparent as the detailed description thereof proceeds, which description should be read in conjunction with the accompanying drawings, in which:

Figure 2 is a plan view of the machine of Figure 1;

Figure 3 is an end view showing the feed end of the machine of Figure 1;

Figure 4 is an end view showing the discharge end of the machine of Figure 1;

Figure 5 is a partial cross-sectional view showing the carton-conveying and tab-folding means taken along line 5—5 of Figure 2;

Figure 6 is a top cross-sectional view taken along line 6—6 of Figure 1;

Figure 7 is an enlarged partial cross-section at location 7—7 of Figure 6 showing the position of the folding fingers and carton before the start of the tab-folding operation;

Figure 8 is a similar view at location 8—8 of Figure 6 showing the folding fingers and carton near the end of the folding step;

Figure 9 is a similar view at location 9—9 of Figure 6 showing cans entering carton;

Figure 10 is a similar view at location 10—10 of Figure 6 showing the fingers withdrawn from the carton;

Figure 11 is a similar view at location 11—11 of Figure 6 showing the completed can package, one of the cans being broken away to show the manner of locking the cans in the carton;

Figure 12 is an enlarged perspective view of one of the upper folding fingers and its supporting elements;

Figure 13 is an enlarged perspective view of one of the lower folding fingers and its supporting elements;

Figure 14 is a perspective view of a carton of the type adapted to be loaded with cans by the machine of Figures 1 to 13, inclusive, as set up for entry into the machine;

Figure 15 is a perspective view of the carton of Figure 14 with the locking tabs folded inwardly for the reception of cans; and Figure 16 is a perspective view of the carton of Figure 14 loaded with cans.

Figure 1:
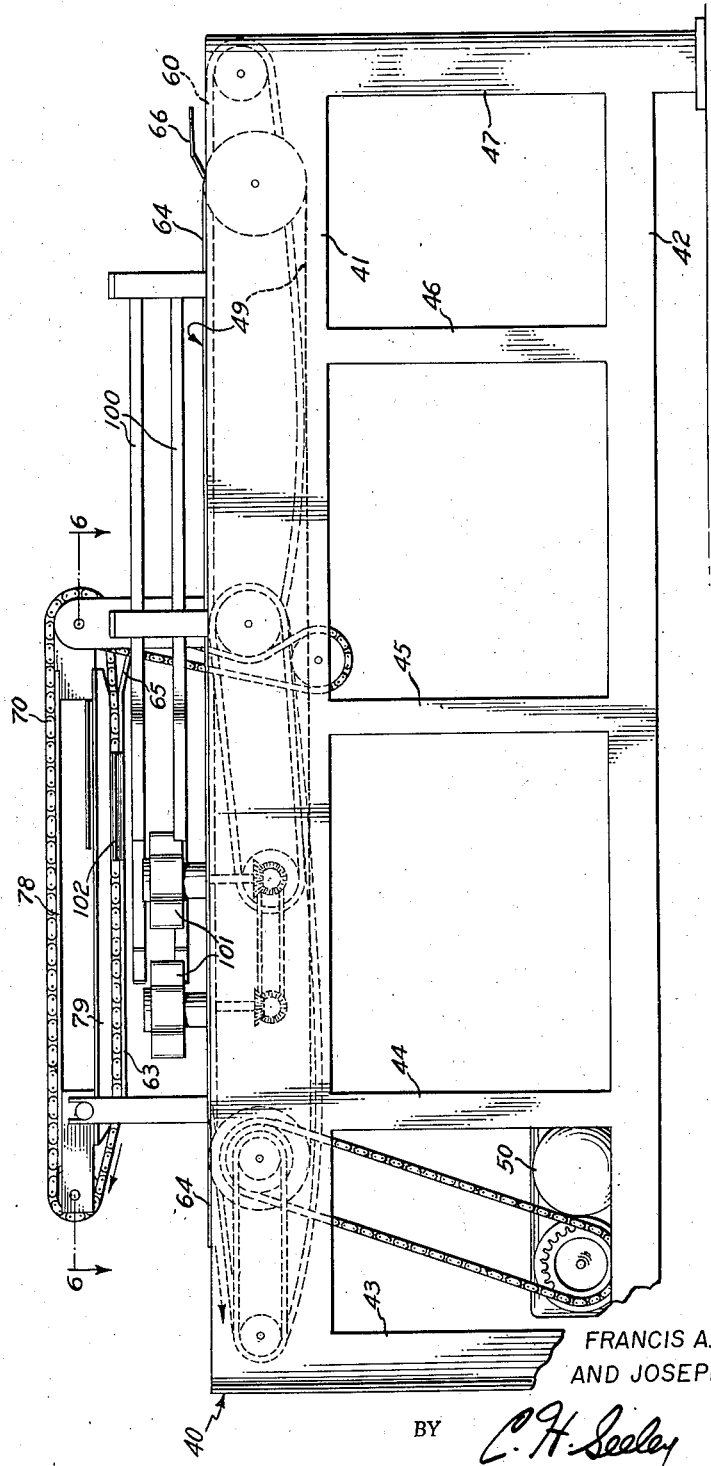
Figure 1 is an elevation of a machine representing a presently preferred embodiment of the invention.

In general, the invention comprises a machine for loading flange-end cans and the like into open-end sleeve-type cartons having at least one can-retaining tab formed from a wall thereof and having the end portion of said wall adjacent the tab extending outwardly beyond the two opposed walls joined to said wall. Such a carton is fully described and claimed in the copending application of Francis A. Chidsey, Jr., Serial Number 531,435, filed August 30, 1955, now abandoned, and a preferred example is also shown in Figures 14 to 16, inclusive, to which reference is now made. The open-end carton 20 is tubular in structure having top wall 21, bottom wall 22, side walls 23 and 24, partition wall 25 and handle 26. Top and bottom walls 21 and 22, are provided adjacent their ends with locking tabs 27 and 28, respectively, cut from the material thereof and hingedly arranged to fold inwardly of the carton and away from the ends thereof so as to retain six cans as shown in Figure 16. The most effective way to load cans into carton 20 is to fold or prebreak locking tabs 27 and 28, preferably to position substantially perpendicular to walls 21 and 22, as shown in Figure 15, and then to slide the cans into the carton so as to fold the tabs 27 and 28 further into can-retaining position.

When the loading is done rapidly and by machine, there is danger that the prebreaking mechanism may cause the top wall 21 or bottom wall 22 to be excessively depressed before the tab associated therewith starts to fold, and this in many cases would cause improper folding and result in defective packages and machine stoppages. In the machine of the invention, a series of cartons 20 is advanced along a predetermined path in set-up condition with their axes transverse to the path, and stationary means are provided adjacent said path which slidingly engage the ends of top wall 21 and bottom wall 22 to support such walls against the excessive depression during the prebreaking step heretofore mentioned. In order to facilitate this action top wall 21 has extended end portions 29 and bottom wall 22 has extended end portions 30, which extend axially outward beyond adjacent portion of walls 23, 24 and 25.

Referring now to Figures 1 and 2 of the drawings, which show general side and top views, repsectively, of a preferred machine according to the invention, a frame 40 is provided comprising generally horizontal members 41 and 42 and vertical members 43, 44, 45, 46 and 47, members 41 having a smooth upper surface and apertures 48 for the reception of can-conveying belts 49. Suitably mounted on frame 40 is an electric motor or other prime mover 50, which through various chains, sprockets and gears generally indicated in Figure 1 cause the various motions to be described below. Since neither these parts, the specific frame construction, nor switches and other electrical apparatus form any part of the invention, they are not shown or described in detail.

As best seen in Figures 2, 3, 5 and 6, the right hand or feed end of the machine is provided with an endless central feed chain 60 having spaced lugs 61, the top surface of which is very slightly below the level of the top of members 41 but at substantially the same level as support bars 62, chain 60 being driven by suitable sprockets not shown. It will be noted that members 41 are spaced apart a distance at least equal to the length of the cartons to be filled with cans, and that lower dead plate 64 extends along the path of carton travel from near the feed end of the machine, where it has an upturned end 66, to a point near the discharge end. Upper dead plate 63 begins adjacent the end of chain 60 and has a downturned end 65. Upper and lower dead plates 63 and 64 are closer to each other, respectively, than members 41, and provide upwardly and downwardly facing shoulders substantially throughout the machine as best brought out in Figures 3 and 4. It is contemplated that, in practice, mechanism would be provided for automatically feeding cartons in flat form, expanding them and introducing them to be driven by consecutive lugs 61 with their axes perpendicular to the direction of motion, but such mechanism is no part of the present invention and is not shown.

Beginning at a location along the length of the machine which is intermediate the ends of feed chain 60 are two upper conveyor chains 70 and two lower conveyor chains 71, chains 70 being located just above and beyond the ends of the cartons to be loaded and chains 71 being located just below and well inwardly spaced from the ends thereof. Chains 70 have spaced pusher fingers 72 extending angularly downwardly and toward each other and chains 71 have spaced pusher fingers 73 extending upwardly therefrom, pusher fingers 72 and 73 being synchronism with each other and being spaced along their respective chains a distance substantially equal to the lateral dimension of the cans to be loaded into the cartons. Secured along the outer side of chains 71 and synchronized with the lower locking tabs in such cartons are tab-folding fingers 74, which are made of resilient material, preferably spring steel in the form of an elongated loop extending in a generally outward direction as best shown in Figure 13. Cam bars 75 extend along the machine in such a way as to engage fingers 74 and cause them to raise up and fold the lower carton tabs in a manner which will be more fully described below.

Chains 70 travel over sprockets 76 and 77, their upper flight, as best seen in Figure 5, resting on bars 78 and their lower flight being positioned against members 79 which have upwardly tapered ends. Thus the lower flights of chains 70 travel from sprockets 77 angularly downward, then horizontally beneath members 79 and angularly upward to sprockets 76. Chains 70 also carry in spaced positions along their inner sides a series of folding devices 80 which are shown in detail in Figure 12. Adjacent link-connecting rods 81 are threaded into and support a specially machined metal block 82. Folding member 83 is mounted for oscillatory motion on block 82 by means of pin 84, one end of member 83 being a curved folding finger 85 and the other a somewhat longer and relatively straight cam arm 86. As will be seen from Figures 3 and 5, the ends of cam arms 86 slide along bars 87 as chains 70 progress along their upper flight. Then as chains 70 move around sprockets 77, arms 86 come in contact with cam bars 88, which, as best seen in Figure 6, have curved portions 89 to support arms 86, outwardly diverging portions 90 which cause fingers 85 to fold the carton tabs and converging portions 91 to allow withdrawal of fingers 85, as hereinafter more fully described.

The can-loading apparatus is fairly conventional, and comprises in this instance three metal can conveyors or belts 49 traveling in the direction of motion of the carton conveyor chains 70 and 71 and synchronized therewith. A continuous succession of cans is supplied to each of these belts 49 by well-known means not shown, and the cans on each belt are guided by means of side rails 100 to star wheels 101, each of which feeds the cans from one of the belts 49 into the cartons traveling through the machine. It will be noted that looking from the feed end, the can line at the left side of the machine feeds the cans between laterally extended portion 102 of left upper dead plate 63 and laterally extended portion 103 of left lower dead plate 64, and the two can lines at the right side of the machine feed cans between extended portion 104 of right upper dead plate 63 and extended portion 105 of right lower dead plate 64.

In operation a series of cartons 20 in set-up condition as shown in Figure 14 are placed on support bars 62 at such a rate that one such carton is advanced along the machine by each lug 61 with its axis perpendicular to the direction of motion, i.e., the ends of the carton are open to the sides of the machine. Almost immediately the extended portions 30 of the bottom wall are led below lower dead plates 64 by means of upturned ends 66 and advance toward the next operation with the upper surfaces of portions 30 in sliding contact with the lower surfaces of dead plates 64. Preferably the lugs 61 are spaced sufficiently that successive cartons are not immediately adjacent each other, and chain 60 moves somewhat faster than chains 70 and 71. The synchronization is such that as a given carton approaches the end of the upper flight of chain 60, it comes into contact with the rearwardly facing edges of one set of pusher fingers 72 and 73 and the lug 61 which had propelled it to that point moves down as chain 60 goes around its sprocket. The spacing between sets of pusher fingers 72 and 73 is such that the next set begins to push the carton with their forwardly facing edges so that forward motion is not lost. It will be noted that at this time also, the extended portions 29 of the carton top wall 21 are positively led by downturned ends 65 above dead plates 63 so that the cartons advance with the lower surfaces of portions 29 in sliding contact with the upper surfaces of dead plates 63.

The subsequent operations are most easily understood from consideration of Figures 7 to 11, inclusive, which represent the several stages in the loading of cans into carton 20. Referring first to Figure 7, the tab-prebreaking step is about to begin, fingers 85 being just above the top wall 21 due to the position of cam bars 88 and the fact that chains 70 are descending angularly along the lower surfaces of members 79 as previously described. Also, fingers 74 are in contact with cam bars 75, but no folding has yet started.

Figure 8 shows the stage in which the locking tabs 27 and 28 have been prebroken, in this instance the inward folding being through an angle somewhat in excess of 90°. It will be noted that fingers 85 have been lowered due to the lower position of chains 70, and that cam bars 88 have diverged to their maximum separation as shown in Figure 6, which has caused fingers 85 to move toward each other on their respective pivots, to carry out the prebreaking of tabs 27. It will also be seen that cam bars 75 have converged upwardly at a slight angle and caused fingers 74 to prebreak tabs 28.

At the stage shown in Figure 9, two of the cans have been inserted by means of star wheels 101, one at each end of the carton 20. The tabs 27 and 28 have been folded further by the can flanges so that they now are substantially at 180° to their longitudinal positions. Although cam arms 86 are no longer urged by cam bars 88, fingers 85 have not yet been removed from contact with tabs 27. Similarly fingers 74 remain wedged between the cans and tabs 28 even though they are no longer held by cam bars 75. It will be noted that the can chimes are not in locking relation to tabs 27 and 28 at this point, but the cans are urged into that relation almost immediately by the relative motion of the cartons and the arms of star wheels 101.

Figure 10 shows that after the third can is inserted chains 70 rise gradually and chains 71 move downwardly as already described to withdraw fingers 85 and 74, respectively. Figure 11 shows the completed package at the discharge end of the machine, the cut-away portion illustrating the locking action of tabs 27 against the inner surface of the can chime.

It will be understood by those skilled in the art that many changes and modifications of the form of the invention hereinabove described may be made without departing from the scope and spirit thereof, and it is therefore desired that the invention be not limited to forms specifically disclosed herein, but only by the language of the appended claims.

We claim:

1. Mechanism for loading cans into a series of open-end tubular cartons moving continuously in a predetermined path, said cartons having foldable can-locking tabs in the top and bottom walls thereof and said top and bottom walls extending axially beyond the side walls of said cartons, comprising dead plate means extending along said path adapted to slidably engage the upper and lower surfaces of the extended portions of said bottom and top walls, respectively, finger means adapted to fold said tabs inwardly while said cartons are in motion and engaging said dead plate means, and means for inserting cans into said cartons while said cartons are in motion and engaging said dead plate means.

2. In a machine for loading cans into relatively elongated open-end tubular cartons of rectangular cross-section, said cartons having foldable can-locking tabs formed from and hinged to the top and bottom walls thereof and having extended portions on the ends of said top and bottom walls, the combination which comprises conveyor means for moving a series of said cartons continuously in a predetermined path with their longitudinal axes transverse to said path, upper and lower dead plates along and at each side of said path adapted to engage in sliding contact the lower and upper surfaces of the extended portions on said top and bottom walls, respectively, finger means adapted to fold said tabs inwardly through at least 90° while said extended portions engage said dead plates, means for moving said finger means along said path in synchronism with said conveyor means, and means for feeding cans into said cartons between the upper and lower dead plates at each side of said path while said dead plates engage said extended portions.

3. The combination according to claim 2 wherein said finger means are mounted on said conveyor means.

4. The combination according to claim 2 wherein said conveyor means comprises two upper and two lower chain conveyor members, each of said members having spaced carton-contacting lugs mounted thereon and also having said finger means mounted thereon in spaced relation.

References Cited in the file of this patent
UNITED STATES PATENTS

| | | |
|---|---|---|
| 2,669,076 | Ormsby | Feb. 16, 1954 |
| 2,739,430 | Griswold | Mar. 27, 1956 |